No. 658,206. Patented Sept. 18, 1900.
J. C. COLLINS.
PARCEL TYING MACHINE.
(Application filed Feb. 17, 1899.)
(No Model.) 4 Sheets—Sheet 1.

Attest:
W. P. Smith
A. J. McCaulrey

Inventor:
J. C. Collins
By Higdon Longan
atty's

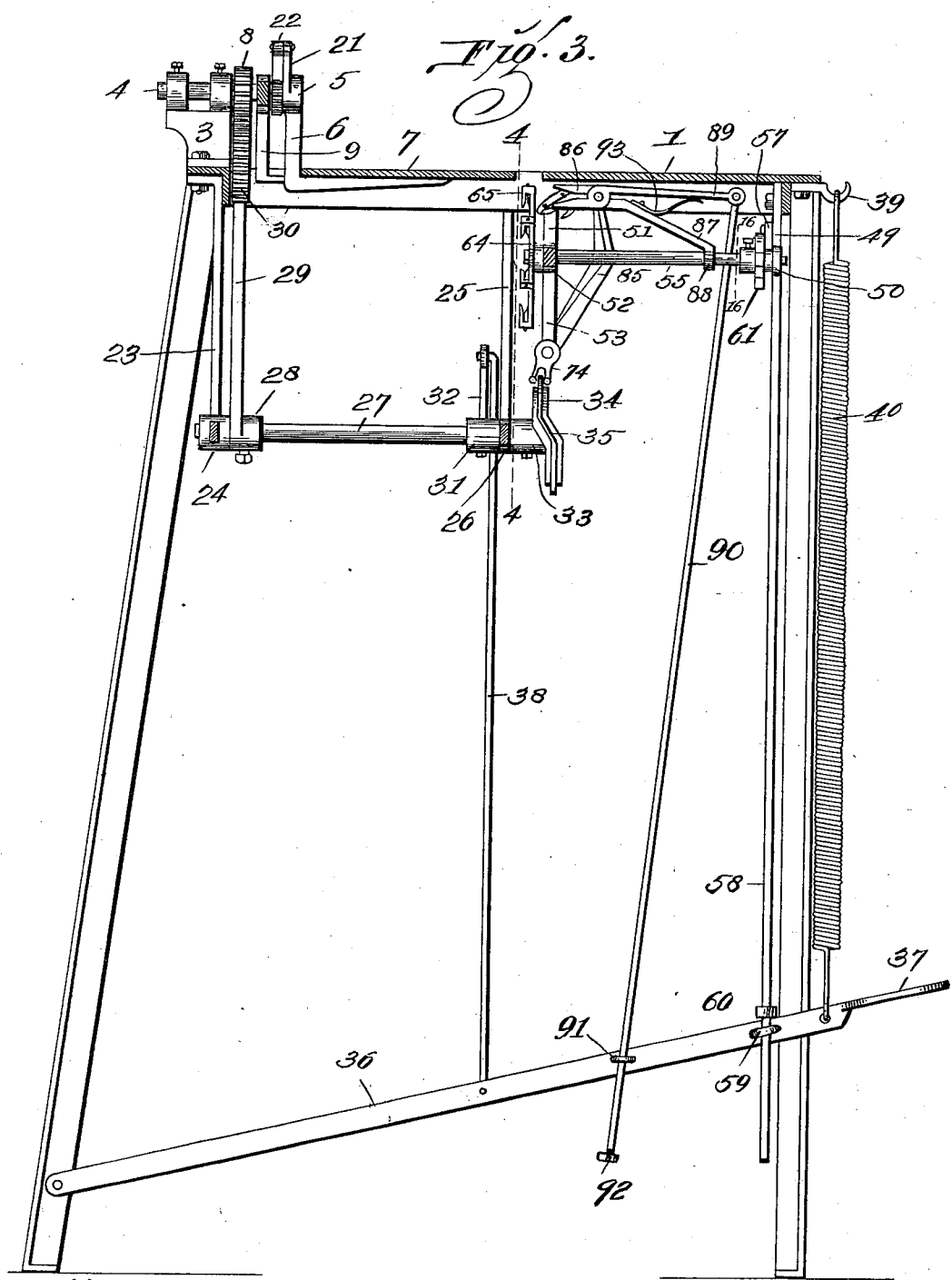

No. 658,206.  
J. C. COLLINS.  
PARCEL TYING MACHINE.  
(Application filed Feb. 17, 1899.)  
Patented Sept. 18, 1900.
(No Model.)  
4 Sheets—Sheet 3.
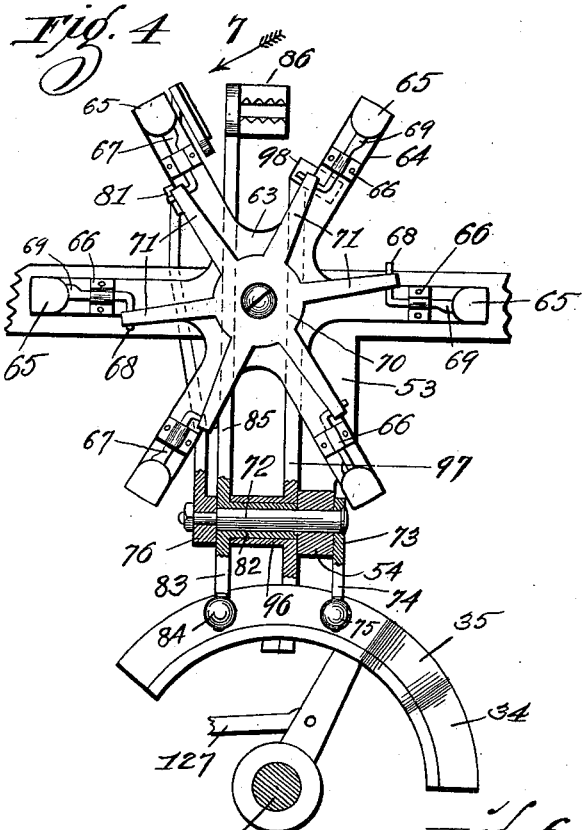
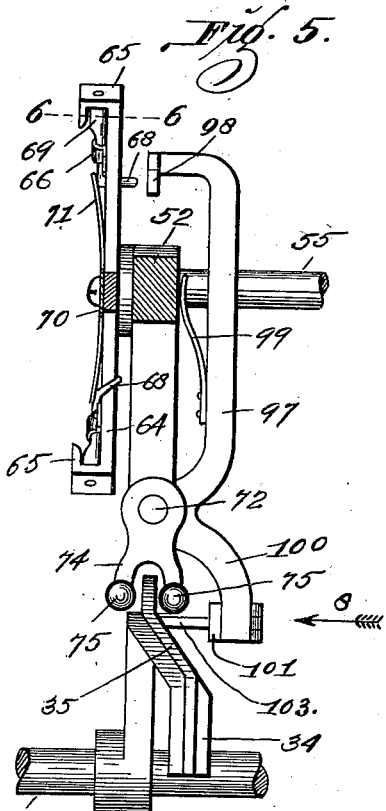
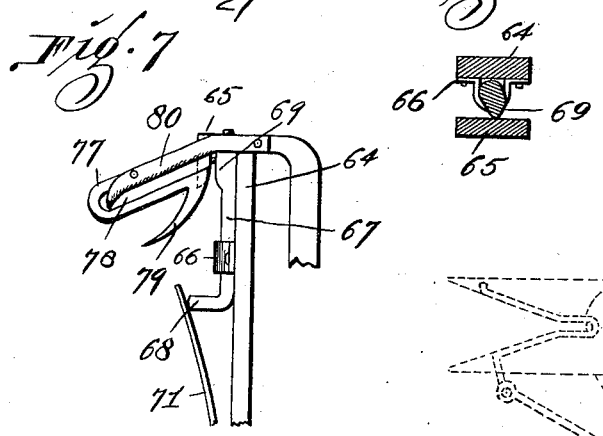
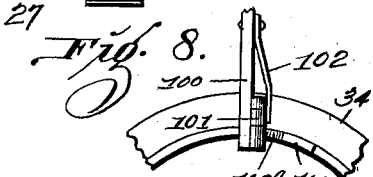
Inventor:  
J. C. Collins.  
By Higdon & Longan, Atty's.

No. 658,206. Patented Sept. 18, 1900.
J. C. COLLINS.
PARCEL TYING MACHINE.
(Application filed Feb. 17, 1899.)
(No Model.) 4 Sheets—Sheet 4.
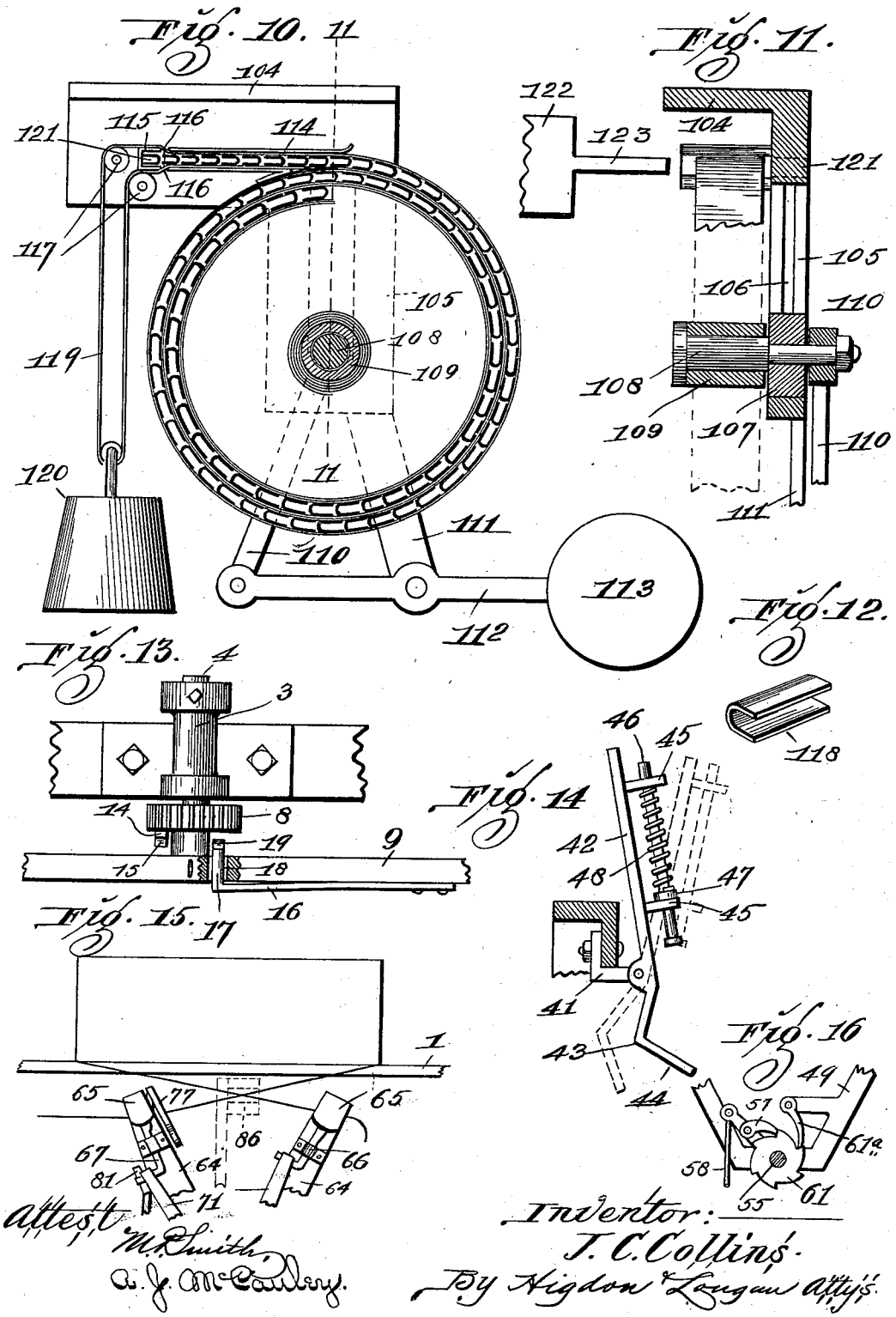

UNITED STATES PATENT OFFICE.

JOHN C. COLLINS, OF KANE, ILLINOIS, ASSIGNOR OF TWO-THIRDS TO RICHARD HUITT, OF UPPER ALTON, ILLINOIS, AND HARRY LINDENBAUM, OF ST. LOUIS, MISSOURI.

PARCEL-TYING MACHINE.

SPECIFICATION forming part of Letters Patent No. 658,206, dated September 18, 1900.

Application filed February 17, 1899. Serial No. 705,927. (No model.)

*To all whom it may concern:*

Be it known that I, JOHN C. COLLINS, of the city of Kane, Greene county, State of Illinois, have invented certain new and useful Improvements in Parcel-Tying Machines, of which the following is a full, clear, and exact description, reference being had to the accompanying drawings, forming a part hereof.

My invention relates to parcel-tying machines; and it consists of the novel construction, combination, and arrangement of parts hereinafter described and claimed.

Figure 1:
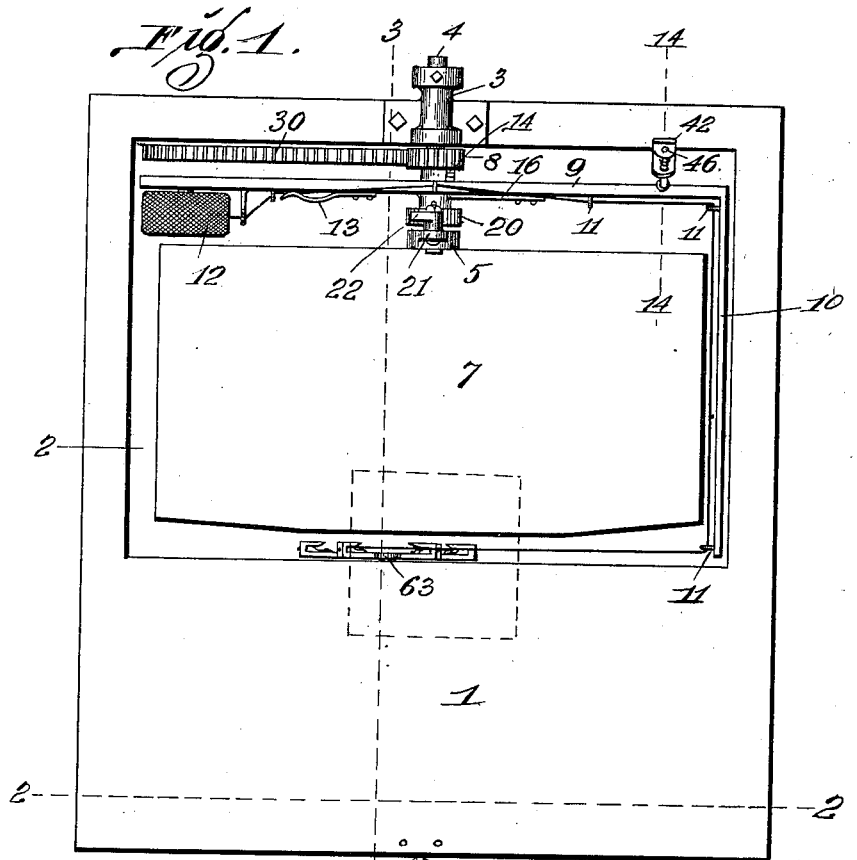
Figure 2:
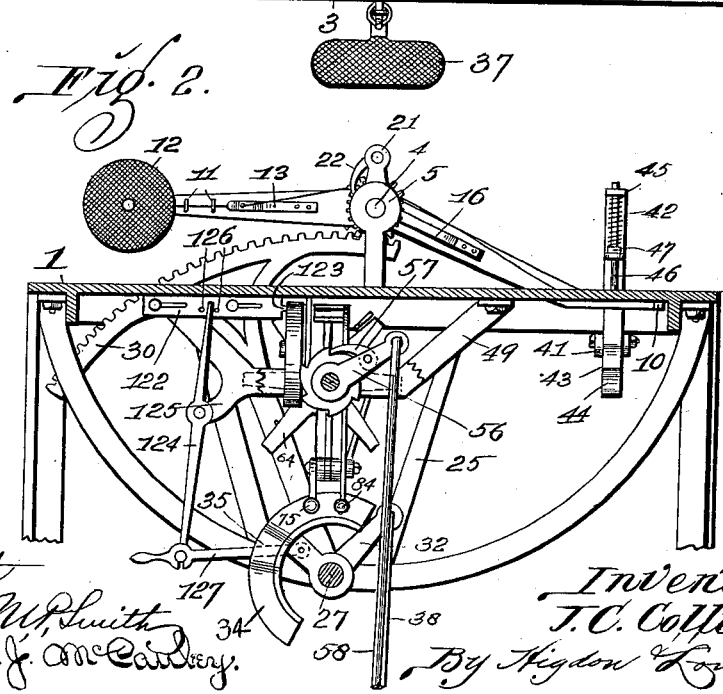

Figure 1 is a plan view of my improved parcel-tying machine. Fig. 2 is a vertical sectional view taken on the line 2 2 of Fig. 1. Fig. 3 is a vertical sectional view taken on the line 3 3 of Fig. 1. Fig. 4 is an enlarged sectional view taken approximately on the line 4 4 of Fig. 3. Fig. 5 is a side elevation of the mechanism seen in Fig. 4. Fig. 6 is a detail sectional view taken approximately on the line 6 6 of Fig. 5. Fig. 7 is a detail view illustrating the mechanism seen looking in the direction indicated by the arrow 7, Fig. 4. Fig. 8 is a detail view illustrating the mechanism seen looking in the direction indicated by the arrow 8, Fig. 5. Fig. 9 is a side elevation of a pair of clamping-jaws made use of in my improved machine. Fig. 10 is an enlarged side elevation of a clip-feeding mechanism made use of in my improved machine. Fig. 11 is a vertical sectional view taken approximately on the line 11 11 of Fig. 10. Fig. 12 is a view in perspective of the clip used for securing the ends of the cord after the same has been passed around the parcel. Fig. 13 is a detail view illustrating a clutch used in my improved machine. Fig. 14 is an enlarged vertical sectional view taken approximately on the line 14 14 of Fig. 1. Fig. 15 is a detail view illustrating the manner in which the cord is passed around the parcel and held before it is tied. Fig. 16 is a detail sectional view taken approximately on the line 16 16 of Fig. 3.

In the construction of my improved machine a flat table 1 is supported by suitable legs, the rear half of which table is provided with a rectangular opening 2. Fixed to and extending upwardly from the center of the rear edge of this table is a bearing 3, in which is rigidly fixed a forwardly-projecting shaft 4. Fixed upon the forward end of this shaft 4 is a collar 5, with which is formed integral a downwardly-pending arm 6, the same supporting a horizontally-arranged table 7, said table being arranged within the opening 2 in the rear portion of the table 1, and said table 7 is somewhat narrower each way than is said opening 2, thus forming an open space entirely around the edge of said table 7. Rotatably arranged upon the shaft 4, adjacent the bearing 3, is a pinion 8, and integral with the hub of said pinion 8 is a transversely-arranged bar 9, with one end of which is formed integral the forwardly-projecting arm 10, the same being so positioned as that it will pass through the spaces at the end of the table 7 when the bar 9 rotates with the pinion 8. The forward end of this arm 10 extends into the space in front of the table 7, and formed on or fixed to the forward end of said arm 10 is an eyelet 11, there being a similar eyelet fixed to the rear end of said arm 10 at the point where it joins the bar 9. Similar eyelets are also arranged upon the inside face of the bar 9 at points intermediate its ends, and another eyelet is arranged upon the top of the center of said bar 9. Held in any suitable manner upon the end of the bar 9, opposite from the end to which the arm 10 is fixed, is a ball of twine 12, the free end of said twine being passed through the various eyelets 11, and said twine is also passed through a spring-tension plate 13, arranged upon the front side of the bar 9.

Rigidly seated in the front face of the pinion 8 is a pin 14, the same being provided with an inclined outer face 15, and arranged upon the front face of the bar 9 is a flat leaf-spring 16, the free end of the same being provided with an integral pin 17, said pin passing through an aperture 18, formed in the bar 9, and its forward end being provided with an inclined face 19 in opposition to the inclined face 15 of the pin 14. The purpose of these pins is to come in contact with each other at a given time for supporting the bar 9.

Formed integral with the hub or bearing of the bar 9 is a ratchet-wheel 20, and pivoted upon a lug 21, that projects upwardly from the collar 5, is a detent 22, the point of which engages the teeth of said ratchet-wheel 20.

Depending from the rear edge of the table 1 is a bracket 23, in the lower end of which is formed a bearing 24, and depending from the table 1 at a point in approximate horizontal alinement with the forward edge of the table 1 is a bracket 25 in every way similar to said bracket 23. Formed integral with the lower end of said bracket 25 and in alinement with the bearing 24 is a bearing 26, and rotatably arranged in these alined bearings is a shaft 27. Removably fixed upon the shaft 27, adjacent the bearing 24, is a collar 28, from which extends upwardly an arm 29, with the upper end of which arm is formed integral a segmental rack 30, the same meshing with the pinion 8. Removably fixed upon the forward end of the shaft 27, just inside the bearing 26, is a collar 31, with which is formed integral an upwardly-projeccting arm 32. Removably fixed upon the end of the shaft 27, that projects through the bearing 26, is a collar 33, with which is formed integral a segmental cam 34, in the center of which cam is formed a lateral bend 35, thus causing the opposite ends of said cam to occupy different planes.

Fulcrumed to the lower portion of the rear of the machine is a foot-lever 36, the same extending forwardly through the machine and being provided on its forward end with a foothold 37. Pivotally secured to the upper end of the arm 32 is the upper end of a vertically-arranged rod 38, the lower end of which is pivotally secured to the center of the foot-lever 36. Secured to the under side of the center of the table 1 and projecting forwardly therefrom is a hook 39, and secured to said hook 39 is the upper end of a retractile coil-spring 40, the lower end thereof being attached to the forward end of the foot-lever 36.

Arranged upon the rear right-hand corner of the table 1 and projecting forwardly into the space behind the table 7 is a bearing 41, upon which is fulcrumed a vertically-arranged bar 42, the lower end thereof being bent forwardly and then rearwardly, as indicated by 43, to form the inclined face 44. Formed integral with and projecting forwardly from the bar 42 is a pair of ears 45, through which is arranged to slide a rod 46, there being a fixed collar 47 arranged upon said rod, and an expansive coil-spring 48 is wound around said rod and interposed between said collar 47 and the upper one of the ears 45. When the upper end of this bar 42 is swung forwardly into the position shown by dotted lines in Fig. 14, the lower end of the spring-actuated rod 46 is in the path of travel of the bar 9, its function being to act as an arrester to receive the shock of sudden stopping of the bar 9 while on its upward stroke, which is brought at a proper time in the path of travel over the bar 9 by the end of the segmental rack coming in contact with the inclined face 44 of the bar 42, bringing it in position, as shown by dotted lines in Fig. 14.

Depending from the center of the front of the table 1 is a bracket 49, in the lower end of which is formed a bearing 50, and depending from the under side of the table 1, just to the rear of the opening 2 therein, is a V-shaped bracket 51, in which is formed a bearing 52, the same being in horizontal alinement with the bearing 50. From this bearing 52 the bracket 51 is extended downwardly, as indicated by 53, and a bearing 54 is formed integral with the lower end of said downwardly-extending portion. Rotatably arranged in the alined bearings 50 and 52 is a shaft 55. Upon said shaft 55, just inside the bearing 50, is loosely mounted an arm 56, upon which is pivoted a spring-actuated pawl 57. To the outer end of this arm 56 is pivotally secured the upper end of a vertically-arranged rod 58, the lower end thereof passing through a loop 59, carried by the foot-lever 36, and fixed upon said rod 58, just above the loop, is a set-collar 60.

Fixed upon the shaft 55, adjacent the arm 56, is a ratchet-wheel 61, with the teeth of which the point of the pawl 57 engages. Fulcrumed upon a portion of the bracket 49, that extends over the ratchet-wheel 61, is a detent 61$^a$, the point of which engages the teeth of said ratchet-wheel 61 to prevent a reverse movement thereof.

Upon the forward end of the shaft 55, in front of the bearing 52 and immediately below the space in front of the table 7, is a rimless wheel 62, there being the same number of arms 64 in this wheel as there are notches in the ratchet-wheel 61. The outer ends of these arms 64 are formed into the hooks 65, and arranged upon the rear faces of said arms adjacent said hooks are the bearings 66. Rotatably arranged in these bearings 66, in the upper ends of the hooks 65, are short rods 67, the lower ends thereof being bent laterally and also rearwardly, as indicated by 68, and integral with said rods underneath the hooks 65 are the lugs 69.

Held in any suitable manner to the outer face of the wheel 63 is a disk 70, from which projects radially a plurality of spring-arms 71, the outer ends thereof engaging directly upon the laterally-bent ends 68 of the rods 67.

Rotatably arranged in the bearing 54 is a shaft 72, upon one end of which is fixed an arm 73, the lower end of which is bifurcated, as indicated by 74, and said bifurcated lower end extends downwardly over the rim of the cam 34. The lower ends of said bifurcated ends are provided with ball-bearings 75 To the opposite end of the shaft 72 is fixed the lower end of a vertically-arranged arm 76, the upper end thereof being formed into a forwardly-projecting arm 77, the same being bent rearwardly, so as to form the loop 78, and the end of said rearwardly-bent portion is formed into an outwardly-curved guide or finger 79. Secured to the side of the forwardly-projecting arm 77 is a knife 80, the cutting edge of which extends downwardly into the loop 78. A lug 81 is formed integral with this arm 76, said lug extending forwardly and being so located as that when the arm 76 is thrown forwardly it will engage against the laterally-bent end 68 of one of the rods 67.

Rotatably arranged upon the shaft 72, between the bearing 54 and the lower end of the arm 76, is a sleeve 82, with one end of which is formed integral a downwardly-projecting plate 83, the lower end of which is bifurcated and provided with the ball-bearings 84, said ball-bearings being arranged on opposite sides of the rim of the cam 34. An arm 85 extends upwardly and rearwardly from this sleeve 82, and to the upper end of said arm 85 is fixed the upper jaw of a pair of pincers 86. The handle 87 of the upper jaw of this pair of pincers extends forwardly and downwardly, its extreme lower end being bifurcated, as indicated by 88, and seated upon the shaft 55 immediately in front of the ratchet-wheel 61. The handle 89 of the opposite jaw extends rearwardly immediately beneath the table 1, and to the rear end of said handle 89 is secured the upper end of a rod 90, the same extending downwardly through a loop 91, secured to the side of the foot-lever 36, and upon the extreme lower end of said rod 90 is located a fixed nut or head 92. A leaf-spring 93 is secured to the handle 87, its free end bearing on the under side of the handle 89, thus normally holding said jaws apart. The inner meeting faces of the clamping-jaws of this pair of pincers are corrugated, said corrugations extending longitudinally relative said jaws. A V-shaped guide 94 is pivotally secured at one end to the forward end of the side of the upper jaw of this pair of pincers, the opposite end of said guide being pivotally secured to the connecting-rod 95, the rear end of which is pivotally secured to the upper end of the arm 85. Normally the apex or point of this V-shaped guide 94 occupies a position below the space between said jaws; but when the pincers are actuated and moved forwardly said apex or point moves upwardly into horizontal alinement with the space between said jaws owing to the change in position of said pincers relative the arm 85.

Rotatably arranged upon the sleeve 82 is a sleeve 96, with one end of which is formed integral an upwardly-projecting arm 97, the upper end of which is provided with a plate 98, which occupies a position immediately behind the path of travel of the laterally-bent ends 68 of the rods 67. A leaf-spring 99 is secured to the inner face of this arm 97, the free end of said spring bearing against the rear side of the bearing 52. From the sleeve 96 the arm 97 is extended downwardly, as indicated by 100, and to the lower end of said extension is hinged a plate 101, against which bears the free end of a leaf-spring 102, that is secured to said extension 100. A lug 103 is formed integral with the rear side of the cam 34, which lug is provided with an inclined face 103$^a$, which is arranged to bear against the free end of the hinged plate 101 and move the same, together with the lower end of the extension 100, outwardly to cause the upper end of the arm 97 to move forwardly.

Secured to the under side of the forward edge of the table 1 is a bracket 104, with one end of which is formed integral a downwardly-extending portion 105, the same being provided with a vertical slot 106, and arranged to move vertically in said slot is a bearing 107. A shaft 108 is rotatably arranged in said bearing 107, upon which shaft is rotatably arranged a sleeve 109. Upon the end of the shaft 108, that projects through the bearing 107, is pivotally held the upper end of a connecting-rod 110. An arm 111 projects downwardly from the lower end of the portion 105, and to the lower end of said arm 111 is fulcrumed an arm 112, one end of which is pivotally secured to the lower end of the arm 110. Upon the free end of this arm 112 is arranged a weight 113. Horizontally arranged upon the face of the bracket 104 is a pair of parallel guide-strips 114, at the forward end of which is arranged a rectangular pocket 115, the same being separated from the ends of said guide-strips 114 by the transverse slots 116. Immediately in front of and below this pocket 115 are rotatably arranged antifriction-rollers 117.

The U-shaped sheet-metal ties or clips 118, (see Fig. 12,) used for securing the ends of the cord or twine that is manipulated by my improved machine, are arranged between a pair of tapes 119 and are held for use in the form of a coil, the same being arranged upon the sleeve 109, and the free ends of said tapes 119 are extended through the guide-strips 114, thence through the slots 116, from thence over the antifriction-rollers 117, and said tapes have their ends joined, and the weight 120 is secured to said ends. As the weight descends the tapes unwind from the body of the coil located on the sleeve 109, and the ties or clips are fed one at a time into the pocket 115. There is an aperture 121 formed through the bracket 104 directly opposite the pocket 115, and held to slide laterally upon the under side of the plate 1 in alinement with and at right angles to said pocket 115 is a plate 122, the point 123 of which is intended to pass through the pocket 115. An actuating-rod 124 is fulcrumed upon the portion 125 of the bracket 51, the upper end of said actuating-rod passing between the pair of pins 126, projecting outwardly from the plate 122, and the lower end of said rod 124 is pivotally connected to the connecting-rod 127, the opposite end of which is journaled to the arm that carries the cam 34.

When the machine is ready for use, the end of the ball of twine 12 is passed beneath the spring tension 13 through the eyelets 11 and passes into the hook 65 of the upper left-hand one of the arms 64. The parcel or bundle to be tied is located immediately over the space in front of the table 7, as shown by dotted lines in Fig. 1, and the operator now moves the forward end of the lever 36 downwardly by pressing his foot upon the foothold 37. This movement partially rotates the shaft 27 through the medium of the arm 32 and connecting-rod 38, and consequently the segmental rack 30 is partially rotated, and as a result of the movement of this rack 30 the pinion 8 makes two complete revolutions, and the twine carried by the end of the arm 10 is passed twice around the parcel lying upon the meeting edges of the tables 1 and 7. Just before the arm 9 completes its second revolution the upper end of the arm 76 is drawn forwardly for the reason that the angled portion 35 of the cam 34 actuates the plate 73, that is fixed to the shaft 72, upon which said arm 76 is fixed. The lug 81, carried by the upper end of said arm 76, strikes against the laterally-bent portion 68 of the rod 67 and said rod is slightly rotated, and this movement causes the contact-point of the lug 69, carried by the upper end of the rod 67, to move out of contact from the inner surface of the hook 65, against which it is normally held by the action of the leaf-springs 71 pressing against the short arm 68 of the rod 67, and the twine will be guided into said hook 65 by the curved finger 79, and when the upper end of the arm 76 moves rearwardly the leaf-spring 71, engaging upon the laterally-bent end 68 of the rod 67, will return said rod to its normal position, and the lug 69, carried thereby, will engage upon and hold the twine. (See Fig. 7.) The lugs 69 are normally held against the inner faces of the hooks 65 by the action of the leaf-springs 71. The arm 9 now completes its second revolution and the rack 30 passes out of mesh with the pinion 8 to the extreme right thereof, leaving said arm 9 at rest, while the remaining parts are in action by the manipulation of the rods 58 and 91 by means of the foot-lever, allowing the rack to follow to the right idle by the action of the rod 38, and said arm is prevented from further movement by the positioning of the point of the pawl 22 between the teeth of the ratchet-wheel 20. In the meantime the connecting-rod 127 has actuated the arm 124, and the plate 122 has been moved laterally, and the point 123 of said plate has passed through the pocket 115 and forced the sheet-metal clip or tie 118, that was located in said pocket, to a point between the jaws of the pincers 86. The downward movement of the foot-lever 36 being continued, said pincers, with a metal tie or clip therein, will be moved forwardly and upwardly, as illustrated by dotted lines in Fig. 9, owing to the actuation of the arm 85 by the angled portion of the cam 34, and as said jaws move into this position the V-shaped guide 94 will swing upwardly into the position as shown by dotted lines in Fig. 9, owing to the change in position of said pincers relative the arm 85, and the crossed twine will be guided into the U-shaped tie or clip. The lever 36 now strikes the head or nut 92, carried by the lower end of the connecting-rod 90, and the jaws of the pincers close upon the tie or clip, thus securing it upon the cord at the desired point. As the inner faces of the jaws of these pincers are corrugated longitudinally, the tie or clip in being secured upon the ends of the twine is correspondingly corrugated, thus very rigidly and securely holding the ends of the twine together. The pressure of the foot-lever 36 is now released and the spring 40 immediately pulls said foot-lever upwardly into the position shown in Fig. 3, and following this movement the jaws of the pincers open, owing to the fact that the pressure is released from the head or nut 92 on the rod 90, and the upper handle 89 of said pair of pincers is elevated by the action of the leaf-spring 93. This allows the clip or tie 118 to pass out from between the jaws of the pincers, and at the same time said pincers are moved rearwardly by the return movement of the cam 34. The arm 76 also moves rearwardly by the return movement of the cam 34, and the pressure of the lug 81 upon the laterally-bent end 68 of the rod 67 is released, and the leaf-spring 71, that is positioned directly in front of this particular laterally-bent end 68, causes said laterally-bent end to reassume its normal position, and in so doing said rod 67 is partially rotated and the lug or eccentric 69 is so moved that it pinches or closes upon the twine positioned within the hook 65, and as the knife 80 moves rearwardly with the upper end of the arm 76 said twine will be severed. This action leaves the end of the twine that feeds from the ball 12 held in one of the hooks 65 beneath the lug 69. With the return movement of the cam 34 the lug 103 strikes against the hinged plate 101, carried by the lower end of the arm 100, and as said hinged plate is arranged to swing in an opposite direction to that in which said lug is moving said hinged plate and the lower end of said arm 100 are moved outwardly by riding against the inclined face 103$^a$ of said lug 103, and consequently the upper end of said arm 100, carrying the lug 98, will be moved forwardly, and the laterally-bent end 68 of the rod 67, beneath the lug of which is clamped the original end of the twine, is moved forwardly, thus causing the lug of this particular rod 67 and said original end of the twine, which is now one of the ends of the twine that passes around the package, to be released, and the package is free to be removed from its position on the tables 1 and 7. The foot-lever 36 just before reaching its upper limit of movement strikes against the set-collar 60, and the rod 58, on which said set-collar is located, is elevated a short distance, and the pawl 57 carried by the arm 56, to which is secured the upper end of said rod 58, will move the ratchet-wheel 61 and shaft 55, carrying said ratchet-wheel, one-sixth of a revolution. During the time the rod 58 and pawl 57 are in their downward position the detent 61ª holds the ratchet-wheel 61 from moving rearwardly. As the shaft 55 is thus rotated one-sixth of a revolution, the arm 64 beneath the hook 65, in which is carried the end of the twine, is brought into position for the next operation of wrapping a package. The downward movement of the foot-lever in actuating the cam 34 causes the connecting-rod 127 to move laterally, this action moving the rod 124 upon its fulcrum and withdrawing the point 123 of the plate 122 out from the pocket 115, in which it has been positioned, and the upward movement of the foot-lever causes a reversal of these movements, and the point 123 of said plate 122 passes into the pocket 115 and forces the tie or clip 118, that has been located in said pocket, into a position between the jaws of the pincers. The weight 120 causes the coil carrying the ties or clips to slowly unwind and to feed the clips one at a time into the pocket. As the coil slowly unwinds the weight 113 will move the opposite end of the arm 112 upwardly, and the shaft 108, carrying the coil, will move upwardly through the slot 106. The bar 9 gathers considerable momentum during its rotation around the shaft 4, and the shock of its sudden stoppage is received by the spring-actuated rod 46, which is moved outwardly into the path of travel of said bar 9 by the engagement of the segmental rack 30 against the inclined face 44 of the lower end of the bar 42, this action taking place just before the completion of the second revolution of said bar 9.

If it is desired to wrap the package both ways and use but one tie instead of wrapping it twice around in one direction, the package is horizontally turned by hand one-quarter around in a plane parallel with the top of the table at the completion of one rotation of the bar 9, in which latter position the twine is passed around the package at right angles with the former wrapping. The downward movement of the foot-lever does not actuate the arm 97, for the reason that the hinged plate 101 gives way to allow the lug 103, carried by the cam, to pass.

A parcel-wrapping machine of my improved construction is simple in operation, will wrap packages of any size and shape, and saves much time and labor where it is desired to tie a large number of packages.

I claim—

1. A parcel-tying machine, comprising a table having an opening therein, a secondary table arranged in said opening and spaced from the other table upon which tables the parcel may be shifted and the twine carried about it at different angles, a rotatable arm for carrying the twine around the parcel, and a means for severing the twine after it has been carried around the parcel, substantially as specified.

2. A parcel-tying machine, comprising a table having an opening therein, a secondary table arranged in said opening and spaced from the other table, a rotatable arm for carrying the twine around the parcel, a means for severing the twine after it has been passed around the parcel, a means for securing a fastening-clip upon the ends of said twine, and a means for holding the free end of said twine after it has been severed, substantially as specified.

3. A parcel-tying machine, comprising a table having an opening, a secondary table in said opening and spaced from the other table, the said tables forming a flat and unobstructed surface upon which the package to be tied may be shifted and turned at different angles, a pivotally-mounted twine-carrying arm for passing the twine around the package to be tied, means for operating said twine-carrying arm, a binding-clip-feeding mechanism for feeding the clips to clamp the twine, and means for operating said binding-clip-feeding mechanism for clamping the same over the twine, substantially as specified.

4. In a parcel-tying machine, a table having an opening therein, a secondary table arranged in said opening, a twine-carrying arm rotatably held between said tables, means whereby the free end of the twine carried by the arm is held at a point in front of the second-mentioned table, and means whereby the twine-carrying arm is rotated in the space between the tables, substantially as specified.

5. In a parcel-tying machine, a table, a rotatably-arranged bar, an arm integral with said bar, a ball of twine carried by the bar, means whereby said bar and arm are rotated to pass the twine around the parcel to be tied, means for holding the free end of the twine, means whereby clips are clamped upon the free end of the twine and the body of the twine after the same has been passed around the parcel, and means whereby the twine is severed after it has been passed around said parcel, substantially as specified.

6. In a parcel-tying machine, a twine-holding device, comprising a rotatable shaft, a plurality of radially-arranged arms on said shaft, hooks formed integral with the outer ends of said arms, short rods rotatably arranged in said hooks and having laterally-bent ends, lugs formed integral with said rods within said hooks, and leaf-springs having their outer free ends bearing upon the laterally-bent ends of the rods, substantially as specified.

7. In a parcel-tying machine, the combination with a table and a rotatably-arranged twine-carrying arm, of a twine-holding device comprising a rotatable shaft, a plurality of radially-arranged arms on said shaft, hooks formed integral with the outer ends of said arms, short rods rotatably arranged in said hooks and having laterally-bent ends, lugs formed integral with said rods within said hooks, and leaf-springs having their outer free ends bearing upon the laterally-bent ends of the rods, substantially as specified.

8. In a parcel-tying machine, comprising a table, a rotatably-arranged twine-carrying arm, a suitably-bent fulcrumed arm for receiving the shock of the sudden stoppage of the twine-carrying arm, a pair of lugs projecting from the front side of said arm, a rod passing through said lugs, a fixed nut upon said rod above the lower one of said lugs, and an expansive coil-spring upon said rod between said lugs, substantially as specified.

9. In a parcel-tying machine, a table having an opening in the rear end thereof, a secondary table occupying said opening, there being a space formed entirely around said secondary table, a bearing formed on the rear side of the first-mentioned table, a shaft rotatably arranged in said bearing, a bracket carried by the forward end of said shaft for sustaining the secondary table, a pinion arranged upon said shaft, a bar rotatably arranged upon said shaft, a pin projecting outwardly from the face of said pinion, which pin is provided with an inclined face, a leaf-spring fixed upon the rotatably-arranged bar, a pin carried by the outer end of said leaf-spring which passes through the aperture in the bar, the end of which pin is provided with an inclined face in opposition to the inclined face of the first-mentioned pin, an arm fixed to and extending at right angles from the end of the bar, which arm travels through the space at the ends of the secondary table, a twine-holding device arranged beneath the front edge of the secondary table, a segmental rack in mesh with the pinion, and means whereby said segmental rack is actuated, substantially as specified.

10. In a parcel-tying machine, a table having an opening in its rear portion, a secondary table positioned within said opening, there being a space extending entirely around said secondary table, a rotatably-arranged twine-carrying bar operating in the space behind said secondary table, an arm integral with and projecting forwardly from the end of the bar, which arm travels in the space at the ends of the secondary table, means whereby said bar is rotated a certain number of times, means whereby said bar is stopped after it has been rotated the required number of times, a twine-holding device arranged beneath the forward edge of the secondary table, a twine guide and cutter arranged to operate in connection with said twine-holding device, a pair of pincers normally positioned beneath the first-mentioned table for clamping the U-shaped tie upon the ends of the twine after the same has been passed around the parcel, and means whereby the U-shaped ties are fed one at a time between the jaws of the pincers, substantially as specified.

11. In a parcel-tying machine, a rotatably-arranged shaft, a pair of tapes coiled upon said shaft for carrying a plurality of U-shaped metallic ties and means for clamping said ties upon the ends of the twine, substantially as specified.

12. In a parcel-tying machine, a bracket having a vertically-arranged slot therein and having an opening therein, a pocket projecting laterally from said opening, a pair of parallel guide-strips in alinement with said pocket, a block arranged to slide in the vertical slot in said bracket, a shaft rotatably arranged in said block, a pair of tapes coiled upon said shaft, carrying U-shaped clips, said tapes passed between the guide-strips and over and above the pocket, a weight secured to the ends of the tapes after they leave said pocket, and means whereby the shaft carrying the coiled tapes is moved upwardly through the slot in the bracket as said tapes uncoil, substantially as specified.

13. In a parcel-tying machine, the combination with a twine-holding device of a fulcrumed arm, the upper end of which is bent forwardly and downwardly, said arm being extended rearwardly, a curved guiding-finger formed integral with the end of the rearward extension and a knife fixed to the forwardly and downwardly extending bent portion, and means for presenting the cord to the holder, substantially as specified.

14. In a parcel-tying machine, a vertically-arranged fulcrumed arm, a pair of pincers carried by the upper end of said arm, a V-shaped guide having one end fulcrumed to the forward portion of the upper jaw, and a rod pivotally secured to the opposite end of said V-shaped guide and having its opposite end pivotally held to the vertically-arranged arm, and means for presenting the cord to the holder, substantially as specified.

15. In a parcel-tying machine, a fixed bracket having an aperture therein, a pocket extending around said aperture and extending laterally therefrom, a pair of tapes carrying U-shaped twine-clips carried by a shaft, means whereby U-shaped twine-clips are fed one at a time into said pocket, a laterally-moving plate arranged at right angles to the bracket, a pin formed integral with said plate which passes through said pocket and aperture, and means whereby said plate is actuated, substantially as specified.

16. In a parcel-tying machine, a table having an opening in its rear end, an auxiliary table arranged within said opening in such a manner that a space is formed entirely around said auxiliary table, a twine-carrying bar rotatably arranged at the rear end of said auxiliary table, an arm integral with the end of said bar, a twine-holding device arranged beneath the front edge of the auxiliary table, means whereby the twine-carrying bar and arm are rotated to wrap the twine around the parcel, a pair of pincers arranged immediately behind the twine-holding device, means whereby a U-shaped clip is fed into the jaws of said pincers, means whereby the twine after being passed around the parcel is guided into the clip held between the jaws, means whereby said jaws are brought together, and means whereby the twine is cut after the same has been passed around the parcel, substantially as specified.

In testimony whereof I affix my signature in presence of two witnesses.

JOHN C. COLLINS.

Witnesses:
M. P. SMITH,
A. J. McCAULEY.